(12) United States Patent
Lin

(10) Patent No.: US 6,457,899 B1
(45) Date of Patent: Oct. 1, 2002

(54) UNION FOR BUTTING TWO PLASTIC BOTTLES REUSED AS TEACHING AID

(75) Inventor: Fu-Chi Lin, Taipei Hsien (TW)

(73) Assignee: Youth Toy Enterprise Co., Ltd., Taipei Hsien (TW)

( * ) Notice: Subject to any disclaimer, the term of this patent is extended or adjusted under 35 U.S.C. 154(b) by 87 days.

(21) Appl. No.: 09/780,369

(22) Filed: Feb. 12, 2001

(51) Int. Cl.⁷ .............................. B25G 3/00; F16D 1/00; F16G 11/00; F16L 3/00
(52) U.S. Cl. ...................... 403/305; 141/375; 141/364; 141/319
(58) Field of Search .................................. 403/300, 301, 403/302, 305, 307, 308; 285/900; 141/364, 375

(56) References Cited

U.S. PATENT DOCUMENTS

| | | | | |
|---|---|---|---|---|
| 2,767,744 A | * | 10/1956 | Beerman | 141/319 |
| 2,850,050 A | * | 9/1958 | Connolly | 141/126 |
| 3,266,533 A | * | 8/1966 | McHale | 141/364 |
| 3,620,267 A | * | 11/1971 | Seablom | 141/24 |
| 3,877,499 A | * | 4/1975 | Fluster | 141/310 |
| 3,963,063 A | * | 6/1976 | Pascarella | 141/309 |
| 4,201,252 A | * | 5/1980 | Noel | 141/286 |
| 4,313,477 A | * | 2/1982 | Sebalos | 141/301 |
| 4,347,879 A | * | 9/1982 | Blaser | 141/364 |
| 4,625,780 A | * | 12/1986 | Burnham | 141/319 |
| 5,293,913 A | * | 3/1994 | Preszler | 141/367 |
| 6,182,720 B1 | * | 2/2001 | Barnoski et al. | 141/375 |
| 6,382,439 B1 | * | 5/2002 | Belokin et al. | 215/228 |

* cited by examiner

Primary Examiner—Lynne H. Browne
Assistant Examiner—Jori Schiffman
(74) Attorney, Agent, or Firm—Michael D. Bednarek; Shaw Pittman LLP (57) ABSTRACT

A union is adapted to butt two reused plastic bottles at their mouths to provide a teaching aid for simulating the forming of spring and convection due to a pressure difference between two spaces. The union includes a hollow tubular body having a radially extended middle partition. An internal screw thread is provided on an inner wall surface of the union at each side of the middle partition to engage with an external screw thread on the mouth of the plastic bottle. The middle partition is provided with two symmetrical through holes, each of which is axially divided into two parts by a radially inward projected annular rib. Each part of the through holes is sized for a suction tube of predetermined dimensions to insert thereinto. By inserting two or three suction tubes into different parts of the two through holes, screwing the plastic bottles, one of which is partially filled with liquid, to two ends of the union, and turning the union upside down to locate the bottle having liquid at an upper position, the forming of springs and convections at different rates could be simulated in the bottles.

5 Claims, 8 Drawing Sheets

UNION FOR BUTTING TWO PLASTIC BOTTLES REUSED AS TEACHING AID

BACKGROUND OF THE INVENTION

The present invention relates to a union for butting two plastic bottles reused as a teaching aid, and more particularly to a union for butting two plastic bottles, so that experiments can be conducted in the bottles to simulate the forming of different types of springs and convections due to pressure difference between two spaces.

Figure 7:
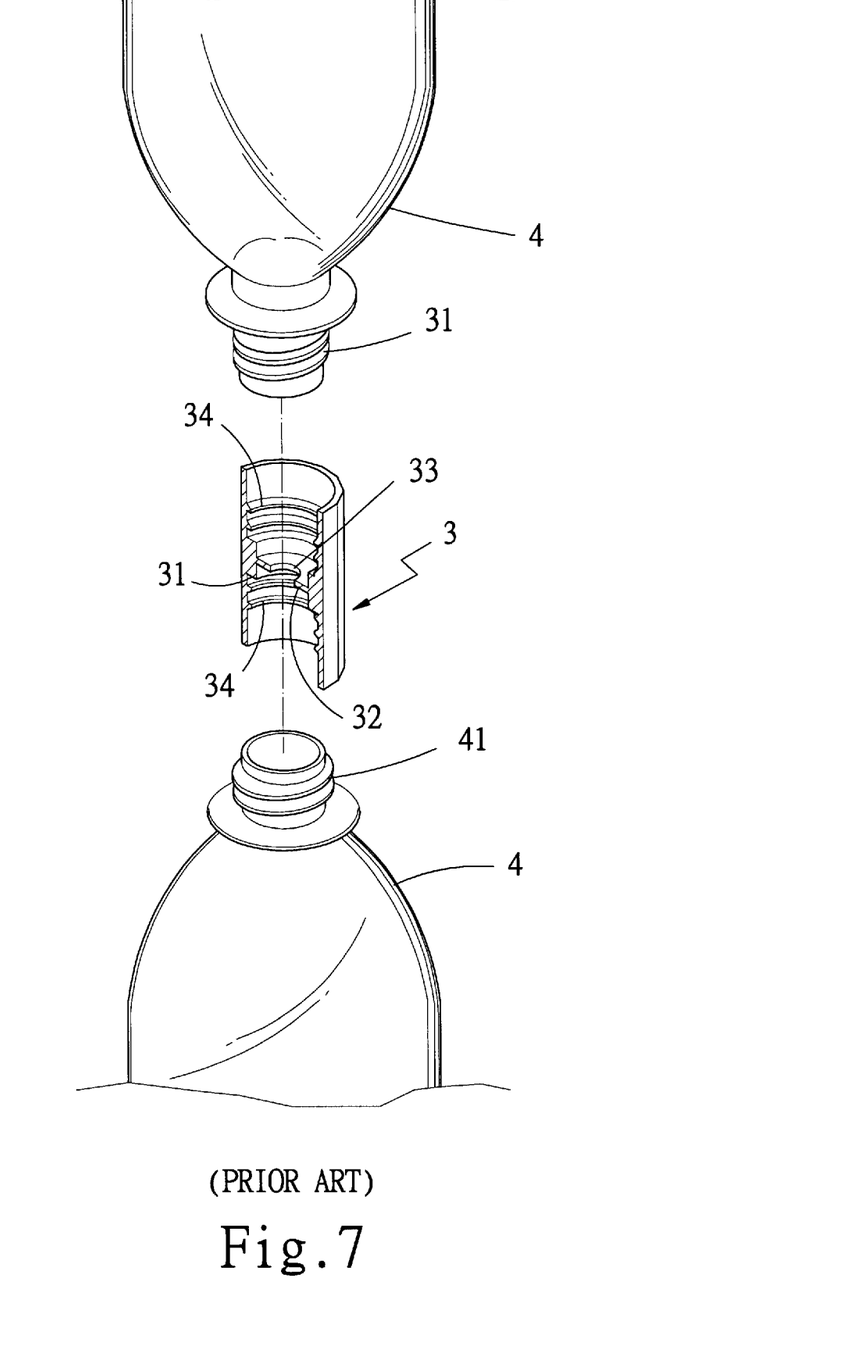
FIG. 7 is an exploded perspective showing the use of a conventional union with two plastic bottles as a teaching aid, wherein the conventional union is partially cut away to show an internal structure thereof.

Plastic bottles are frequently utilized as a teaching aid to simulate the forming a tornado. To do this, two plastic bottles 4 are connected to each other at their mouths by means of a union 3, as shown in FIG. 7. As shown, the union 3 is substantially a tubular member having an annular stop 31 radially inward projected from a middle point of an inner wall surface of the union 3. An annular partition 32 having a central hole 33 is provided at a middle portion of the annular stop 31. The union 3 is provided on its inner wall surface at two sides of the annular stop 31 with two internal screw threads 34, each of which is adapted to engage with an external screw thread 41 around the mouth of the plastic bottle 4, so that two plastic bottles 4 can be separately screwed to two ends of the union 3.

Figure 8:
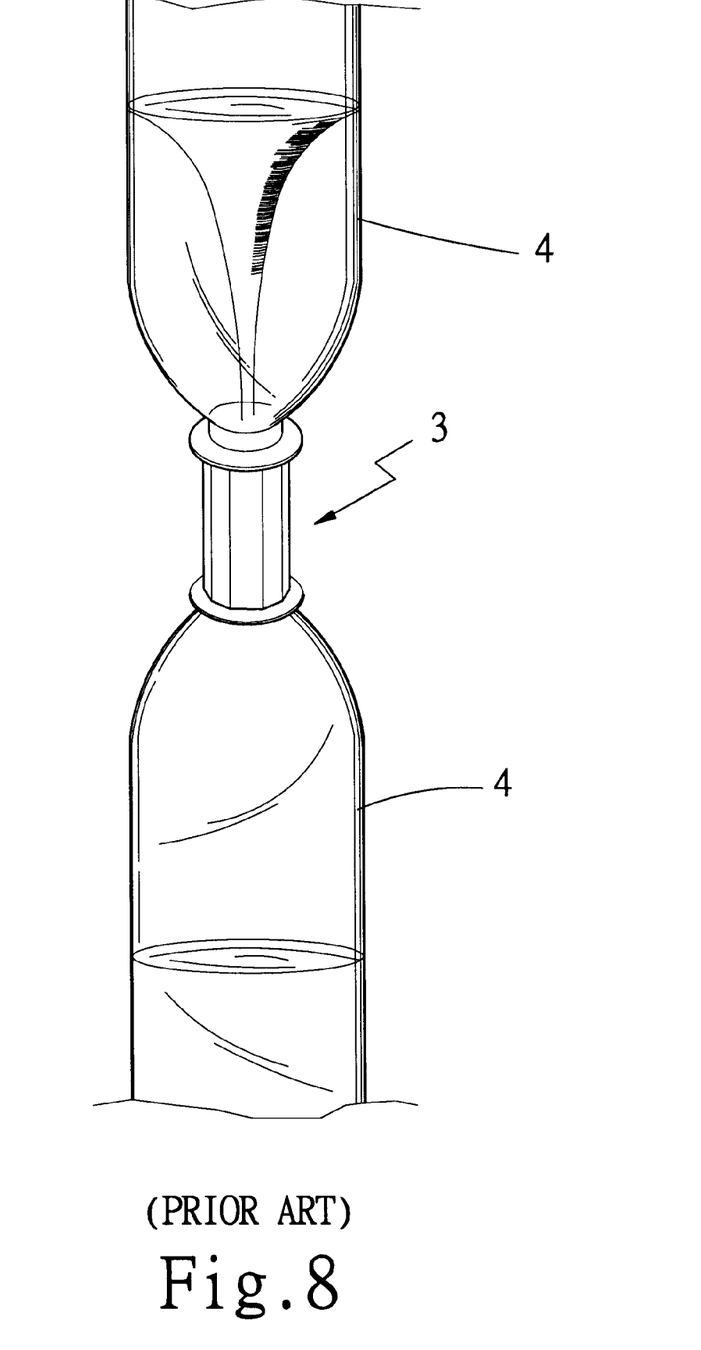
FIG. 8 shows two plastic bottles are butted via a conventional union to conduct an experiment simulating a tornado.

FIG. 8 shows two plastic bottles 4 are connected at their mouths to two ends of the union 3. One of the plastic bottles 4 is partially filled with liquid before being screwed into one end of the union 3. The union 3 with the two plastic bottles 4 is then turned upside down for the bottle 4 having liquid therein to locate at an upper position. When the union 3 and the two connected bottles 4 are properly rotated at the same time, the liquid in the upper bottle 4 flows down into the lower bottle 4 in the form of a whirlpool. One can observe the liquid flow in this experiment to simulate a tornado or a storm. With the union 3, the used plastic bottles 4 could be reused as a good teaching aid and as a good example of environment protection.

However, it is desirable the used plastic bottles could be reused to conduct more experiments in teaching, for example, experiments simulating the forming of different types of springs and convections due to a pressure difference in two spaces.

SUMMARY OF THE INVENTION

A primary object of the present invention is to provide a union for butting two plastic bottles reused as a teaching aid, so as to conduct in the plastic bottles experiments simulating the forming of spring and convection due to a pressure difference between two spaces.

Another object of the present invention is to provide a union for butting two plastic bottles reused as a teaching aid, so as to conduct in the plastic bottles experiments simulating the forming of spring and convection at different rates.

To achieve the above and other objects, the union of the present invention mainly includes a hollow tubular body having a radially inward projected middle partition. An internal screw thread is provided on an inner wall surface of the union at each side of the middle partition to engage with an external screw thread on the mouth of the plastic bottle. The middle partition is provided with two symmetrical through holes, each of which is axially divided into two parts by a radially inward projected annular rib. Each part of the through holes is sized for a suction tube of predetermined dimensions to insert thereinto. By separately inserting two or three suction tubes into different parts of the two through holes, screwing the plastic bottles, one of which is partially filled with liquid, to two ends of the union, and turning the union upside down to locate the bottle having liquid at an upper position, different types of springs and convections due to a pressure difference between two spaces could be simulated in the bottles.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
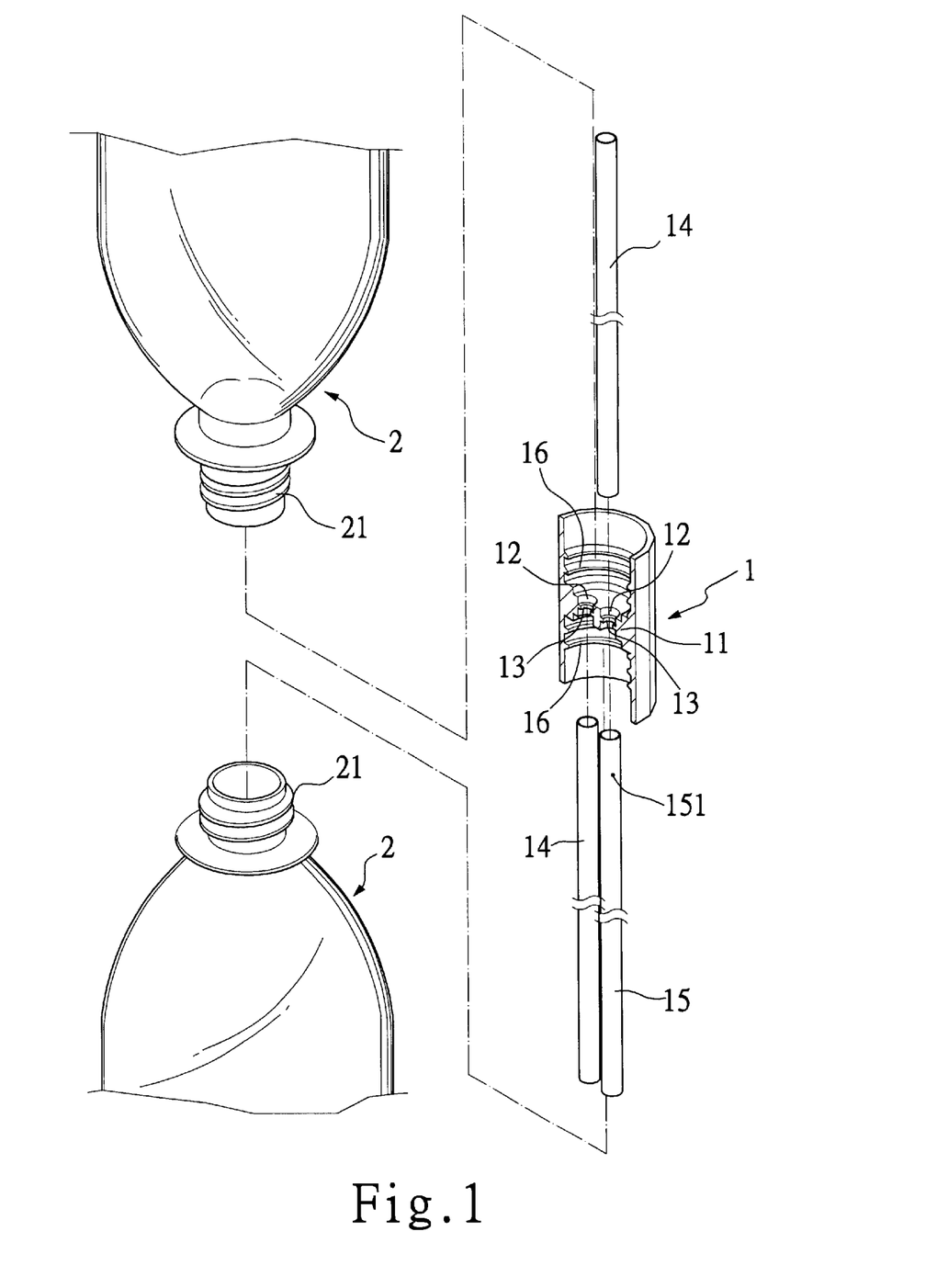
FIG. 1 is an exploded perspective showing the use of a union of the present invention with two plastic bottles and some suction tubes to provide a teaching aid, wherein the union is partially cut away to show an internal structure thereof.

Please refer to FIG. 1 that is an exploded perspective showing the use of a union 1 of the present invention with two reused plastic bottles 2 and some suction tubes 14, 15 to provide a teaching aid. As shown, the union 1 is used to butt two plastic bottles 2 at their mouths. The union 1 is substantially a hollow tubular member having a radially extended middle partition 11 of a predetermined thickness. The middle partition 11 is provided with two laterally symmetrical through holes 12, each of which is provided at an axially middle point with an annular rib 13 radially projected toward a center of the through hole 12, so that the through hole 12 is divided into a first and a second part opposite to each other. The suction tubes 14, 15 are adapted to separately insert an end into the first or the second part of the through holes 12 to abut against the annular ribs 13. The union 1 is also provided on its inner wall surface at each side of the middle partition 11 with an internal screw thread 16 for engaging with an external screw thread 21 provided on the mouth of the plastic bottle 2. The suction tube 14 is different from the suction tube 15 in that the suction tube 14 has a complete wall while the suction tube 15 is provided at a predetermined position with an air hole 151. When the suction tube 15 is inserted into one part of the through hole 12, the air hole 151 is preferably located close to but outside the union 1.

Figure 2:
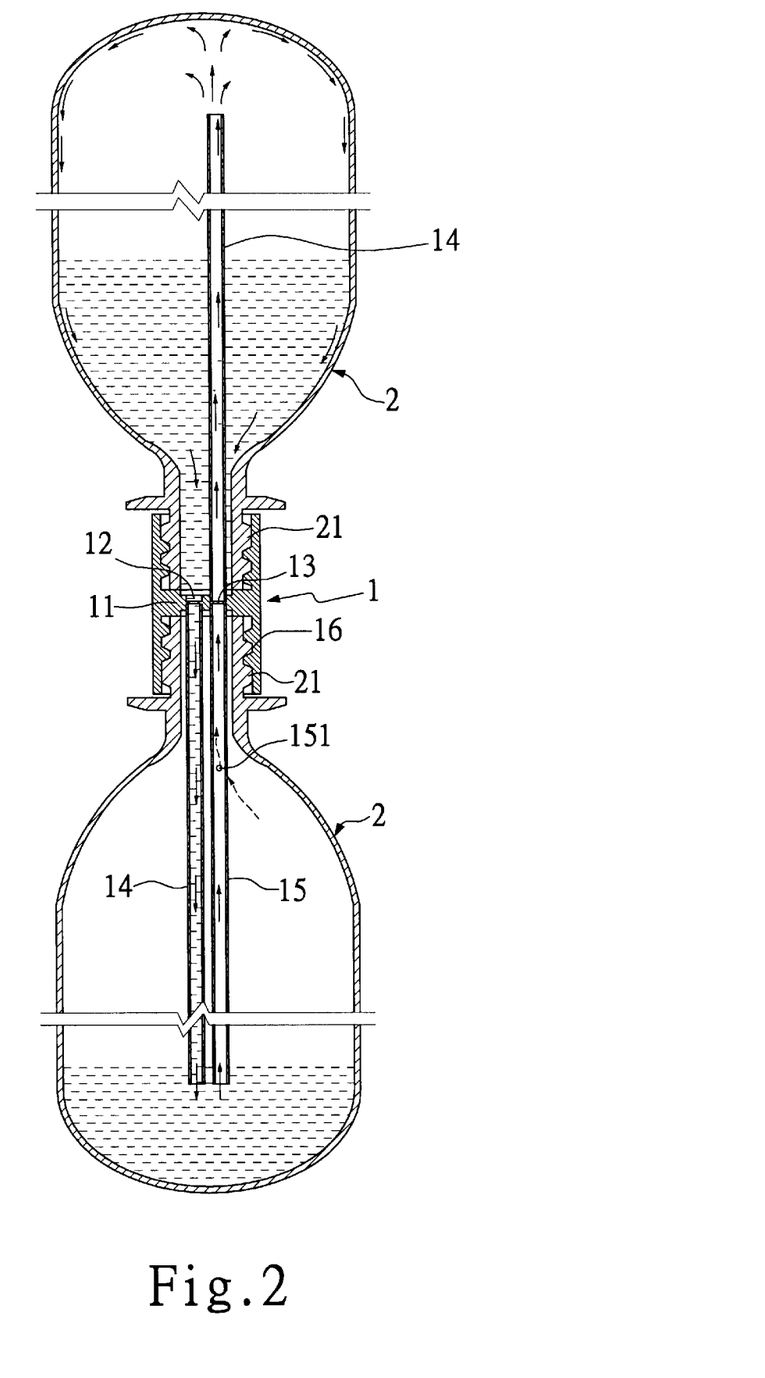
FIG. 2 is an assembled sectional view showing two plastic bottles are butted via the union of the present invention to conduct a first experiment.

FIG. 2 is an assembled sectional view showing two plastic bottles 2 are butted at their mouths by separately engaging the external screw threads 21 on their mouths with the internal screw threads 16 provided on the inner wall surface of the union 1, so that the plastic bottles 2 are firmly screwed into two ends of the union 1 with end surfaces of their mouths tightly pressed against the middle partition 11. One of the two plastic bottles 2 is partially filled with liquid before it is screwed onto the union 1 to face the first parts of the through holes 12. This plastic bottle 2 with liquid will be referred to as the first bottle 2 while the other plastic bottle will be referred to as the second bottle 2. In FIG. 2, one suction tube 14 and one suction tube 15 are respectively inserted into the first and the second parts of one of the two through holes 12 to locate in the first and the second plastic bottles 2, respectively, and another suction tube 14 is inserted into the second part of the other through hole 12 to locate in the second plastic bottle 2.

When the union 1 is turned upside down for the first plastic bottle 2 to locate above the second plastic bottle 2 as shown in FIG. 2, liquid in the first plastic bottle 2 flows into the second plastic bottle 2 via the suction tube 14 that is connected to the second part of the other through hole 12 and extended into the second plastic bottle 2. When an air pressure in the first plastic bottle 2 at an upper position drops due to decrease of liquid in the first bottle 2, an air pressure in the second plastic bottle 2 at a lower position increases due to increased amount of liquid that reduces space for air in the second plastic bottle 2. At this point, air in the second plastic bottle 2 will quickly enter the suction tube 15 via the air hole 151 and flow into the first plastic bottle 2 via the suction tube 14 that is connected to the through hole 12 opposite to the suction tube 15. An amount of liquid in the second plastic bottle 2 is sucked into the suction tube 15 due to the upward airflow and springs from an upper end of the suction tube 14 above the suction tube 15. This is a first experiment that can be conducted in two reused plastic bottles 2 butted via the union 1 of the present invention. In this first experiment, the forming of spring and convection due to a pressure difference between two spaces is simulated. Due to the air hole 151, liquid in the first plastic bottle 2 could completely flow into the second plastic bottle 2 at a quickest speed compared with other experiments that will be described below.

Figure 3:
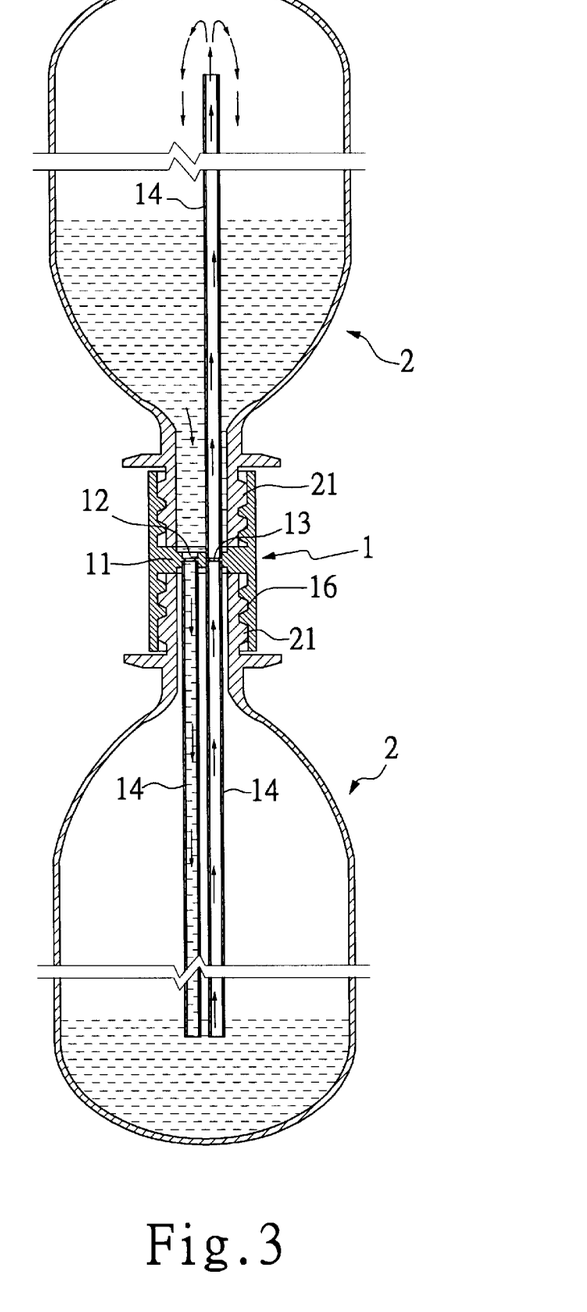
FIG. 3 is another assembled sectional view showing two plastic bottles are butted via the union of the present invention to conduct a second experiment.

FIG. 3 shows a second experiment that could be conducted in two plastic bottles 2 butted via the union 1 of the present invention. In this experiment, two suction tubes 14 are respectively inserted into the first and the second parts of one of the two through holes 12 to locate in the first and the second plastic bottles 2, respectively, and a third suction tube 14 is inserted into the second part of the other through hole 12 to locate in the second plastic bottle 2.

When the union 1 is turned upside down for the first plastic bottle 2 partially filled with liquid to locate above the second plastic bottle 2 as shown in FIG. 3, liquid in the first plastic bottle 2 flows into the second plastic bottle 2 via the third suction tube 14 that is connected to the second part of the other through hole 12 and extended into the second plastic bottle 2. When an air pressure in the first plastic bottle 2 at an upper position drops due to decrease of liquid in the first bottle 2, an air pressure in the second plastic bottle 2 at a lower position increases due to increased amount of liquid that reduces space for air in the second plastic bottle 2. At this point, air in the second plastic bottle 2 will compress an amount of liquid into the other two suction tubes 14 to spring from an upper end of the suction tube 14 in the first plastic bottle 2. This second experiment also simulates the forming of spring and convection due to a pressure difference between two spaces. Again, liquid in the first plastic bottle 2 could completely flow into the second plastic bottle 2. However, since a part of the downward liquid pressure is offset by the air compression in the second plastic bottle 2, liquid flows from the first to the second plastic bottle 2 at a slower speed compared with that in the first experiment shown in FIG. 2.

Figure 4:
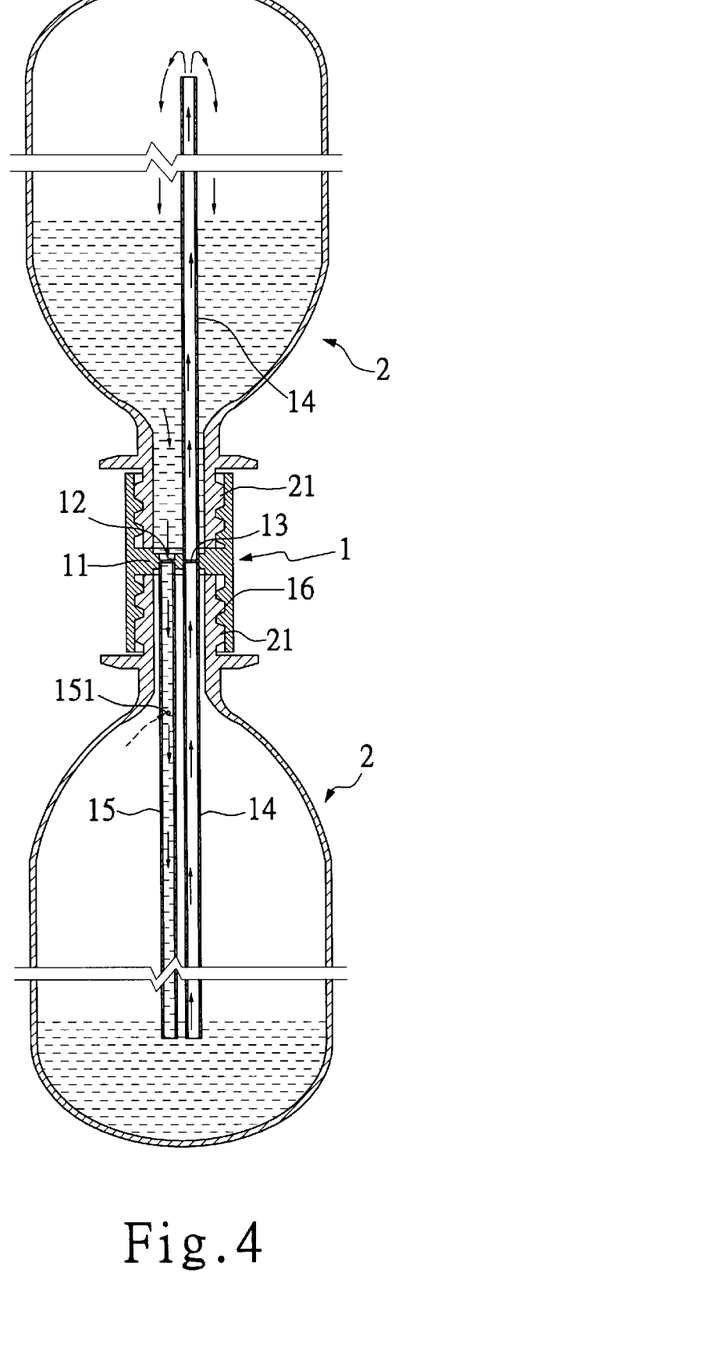
FIG. 4 is still another assembled sectional view showing two plastic bottles are butted via the union of the present invention to conduct a third experiment.

FIG. 4 shows a third experiment that could be conducted in two reused plastic bottles 2 butted via the union 1 of the present invention. In this experiment, two suction tubes 14 are respectively inserted into the first and the second parts of one of the two through holes 12 to locate in the first and the second plastic bottles 2, respectively, and a suction tube 15 is inserted into the second part of the other through hole 12 to locate in the second plastic bottle 2.

When the union 1 is turned upside down for the first plastic bottle 2 partially filled with liquid to locate above the second plastic bottle 2 as shown in FIG. 4, liquid in the first plastic bottle 2 flows into the second plastic bottle 2 via the suction tube 15 that is connected to the second part of the other through hole 12 and extended into the second plastic bottle 2. When an air pressure in the first plastic bottle 2 at an upper position drops due to decrease of liquid in the first bottle 2, an air pressure in the second plastic bottle 2 at a lower position increases due to increased amount of liquid that reduces space for air in the second plastic bottle 2. At this point, air in the second plastic bottle 2 will be forced into the suction tube 15 via the air hole 151 to flow upward and therefore offsets a part of the downward liquid pressure in the suction tube 15. Again, liquid in the first plastic bottle 2 could completely flow into the second plastic bottle 2 in this third experiment but at an even slower speed compared with that in the second experiment shown in FIG. 3.

Figure 5:
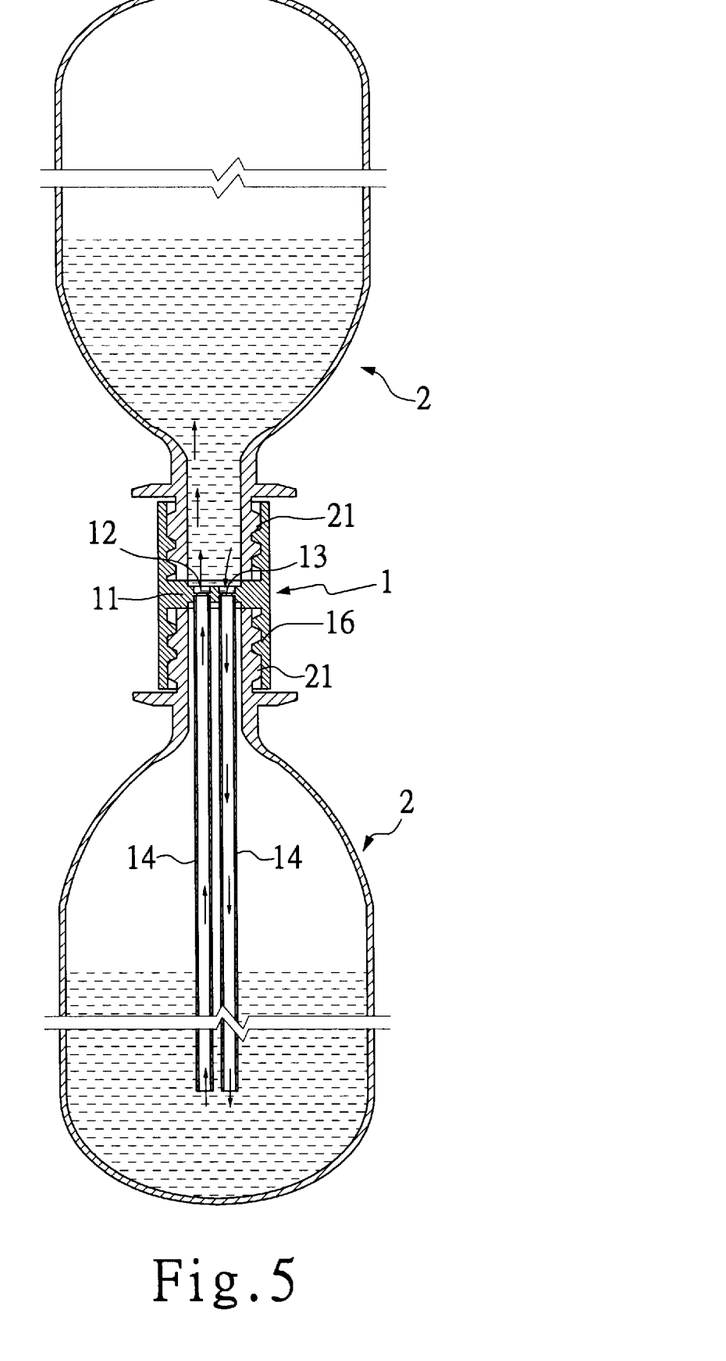
FIG. 5 is still another assembled sectional view showing two plastic bottles are butted via the union of the present invention to conduct a fourth experiment.

FIG. 5 shows a fourth experiment that could be conducted in two plastic bottles 2 butted via the union 1 of the present invention. In this experiment, two suction tubes 14 are respectively inserted into the second parts of the two through holes 12 to locate in the second plastic bottles 2.

When the union 1 is turned upside down for the first plastic bottle 2 partially filled with liquid to locate above the second plastic bottle 2 as shown in FIG. 5, liquid in the first plastic bottle 2 flows into the second plastic bottle 2 via one of the two suction tubes 14. When an air pressure in the first plastic bottle 2 at an upper position drops due to decrease of liquid in the first bottle 2, an air pressure in the second plastic bottle 2 at a lower position increases due to increased amount of liquid that reduces space for air in the second plastic bottle 2. At this point, air in the second plastic bottle 2 will compress an amount of liquid into the other suction tube 14 to flow upward. In this experiment, since the upward liquid flow offsets the downward liquid pressure, liquid in the first plastic bottle 2 could not completely flow into the second plastic bottle 2. Finally, liquid in the first and the second plastic bottles 2 will produce two balanced levels, as shown in FIG. 5.

Figure 6:
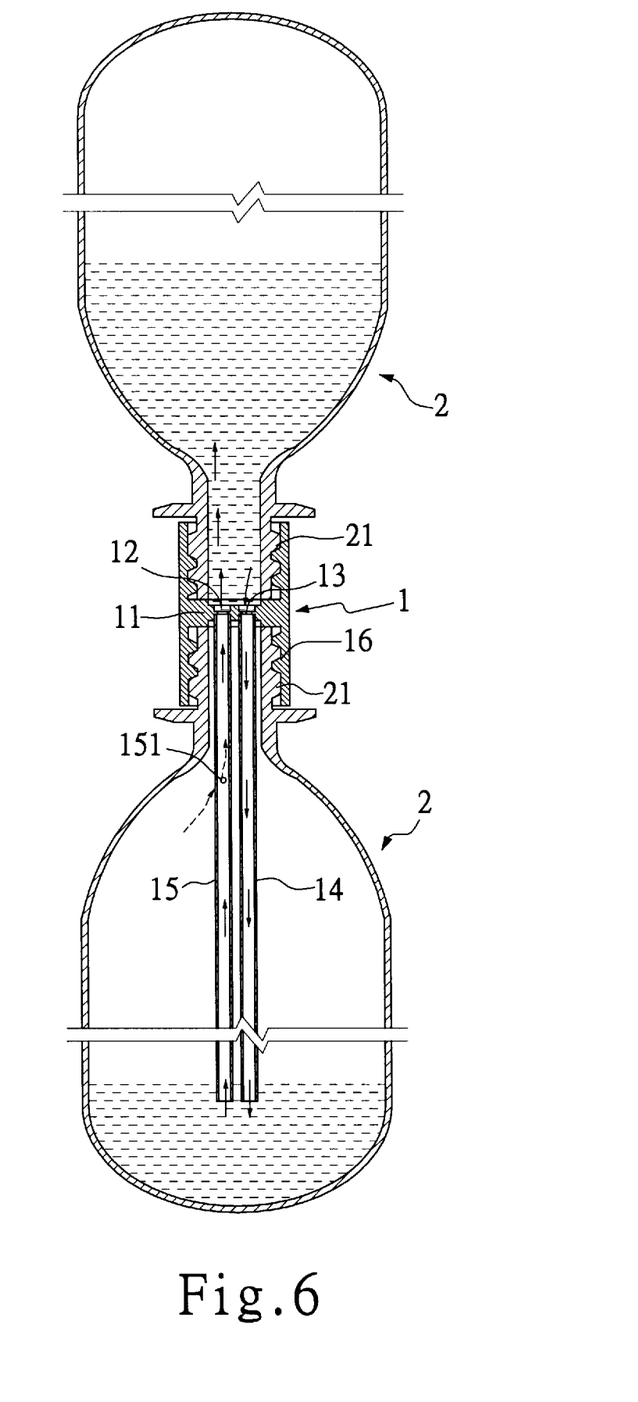
FIG. 6 is still another assembled sectional view showing two plastic bottles are butted via the union of the present invention to conduct a fifth experiment.

FIG. 6 shows a fifth experiment that could be conducted in two plastic bottles 2 butted via the union 1 of the present invention. In this experiment, one suction tube 14 and one suction tube 15 are separately inserted into the second parts of the two through holes 12 to locate in the second plastic bottle 2.

When the union 1 is turned upside down for the first plastic bottle 2 partially filled with liquid to locate above the second plastic bottle 2 as shown in FIG. 6, liquid in the first plastic bottle 2 flows into the second plastic bottle 2 via the suction tube 14. When an air pressure in the first plastic bottle 2 at an upper position drops due to decrease of liquid in the first bottle 2, an air pressure in the second plastic bottle 2 at a lower position increases due to increased amount of liquid that reduces space for air in the second plastic bottle 2. At this point, air in the second plastic bottle 2 will be forced into the suction tube 15 via the air hole 151 to flow upward and therefore offsets a part of the downward liquid pressure. Again, liquid in the first plastic bottle 2 could completely flow into the second plastic bottle 2 in this fifth experiment but at a reduced speed.

In brief, the union provided by the present invention for butting two reused plastic bottles for teaching purpose has increased number of through holes with radially inward projected annular rib, so that increased number of suction tubes may be connected to the union to locate in the two bottles in different manners to simulate the forming of spring and convection at different rates.

What is claimed is:

1. A union for butting two reused plastic bottles at their mouths to provide a teaching aid for simulating the forming of spring and convection due to a pressure difference between two spaces, said union comprising a substantially hollow tubular body having a radially extended middle partition of a predetermined thickness; said middle partition being provided with two laterally symmetrical through holes, each of which is provided at an axially middle point with an annular rib radially projected toward a center of said through hole, dividing said through hole into a first and a second part opposite to each other, and said first and said second parts are so sized that a suction tube of predetermined dimensions is adapted to insert into these parts; and said tubular body being provided on an inner wall surface at each side of said middle partition with an internal screw thread adapted to engage with an external screw thread provided on the mouth of said plastic bottle.

2. A union for butting two reused plastic bottles as claimed in claim 1, wherein each of said first and said second parts of one of said two through holes has one said suction tube inserted thereinto, and said second part of the other said through hole has one said suction tube inserted thereinto.

3. A union for butting two reused plastic bottles as claimed in claim 2, wherein one of said suction tubes inserted into said second parts of said two through holes is provided with an air hole, and said air hole being preferably located close to but outside said union.

4. A union for butting two reused plastic bottles as claimed in claim 1, wherein said second parts of said two through holes respectively have one said suction tube inserted thereinto.

5. A union for butting two reused plastic bottles as claimed in claim 4, wherein one of said suction tubes inserted into said second parts of said two through holes is provided with an air hole, and said air hole being preferably located close to but outside said union.

\* \* \* \* \*